United States Patent
Iijima

(10) Patent No.: US 8,322,229 B2
(45) Date of Patent: Dec. 4, 2012

(54) MEASUREMENT APPARATUS INCLUDING AN ELECTRODE AND HAVING AN ANCHORING PORTION

(75) Inventor: Takuya Iijima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 289 days.

(21) Appl. No.: 12/694,724

(22) Filed: Jan. 27, 2010

(65) Prior Publication Data

US 2010/0192700 A1   Aug. 5, 2010

(30) Foreign Application Priority Data

Feb. 3, 2009 (JP) ................................. 2009-022701

(51) Int. Cl.
*G01F 1/58* (2006.01)
(52) U.S. Cl. ................................................. 73/861.12
(58) Field of Classification Search .................. None
See application file for complete search history.

(56) References Cited

U.S. PATENT DOCUMENTS

| | | | | | |
|---|---|---|---|---|---|
| 3,771,361 | A | * | 11/1973 | Reznick | 73/861.12 |
| 3,813,938 | A | * | 6/1974 | Grosch et al. | 73/861.12 |
| 5,269,191 | A | * | 12/1993 | Wada | 73/861.12 |
| 5,773,723 | A | * | 6/1998 | Lewis et al. | 73/861.12 |
| 7,878,072 | B2 | * | 2/2011 | Iijima | 73/861.12 |
| 2009/0188328 | A1 | * | 7/2009 | Iijima | 73/861.12 |

FOREIGN PATENT DOCUMENTS

JP   2007-240231   9/2007

OTHER PUBLICATIONS

Office Action issued Aug. 26, 2011, in Korean Patent Application No. 10-2010-0009066 (with English-language translation).

* cited by examiner

*Primary Examiner* — Harshad R Patel
(74) *Attorney, Agent, or Firm* — Oblon, Spivak, McClelland, Maier & Neustadt, L.L.P.

(57) ABSTRACT

A measurement apparatus including a lining body and an electrode. The electrode includes an electrode head portion having a first surface to contact a measurement object and a second surface opposite to the first surface, an electrode anchor portion formed around a peripheral portion of the second surface, and an electrode shaft portion. A protruding portion having a semicircular cross-section and a size smaller than a radius of the electrode shaft portion is formed around a peripheral edge portion of the second surface. A counterbore flat surface portion is formed in the lining body to define an arc portion of the inner surface as a flat surface, and while uniformly coming into contact with the counterbore flat surface portion of the lining body with pressure, the protruding portion of the electrode anchor portion bites into the counterbore flat surface portion.

4 Claims, 6 Drawing Sheets

Prior Art

MEASUREMENT APPARATUS INCLUDING AN ELECTRODE AND HAVING AN ANCHORING PORTION

CROSS REFERENCE TO RELATED APPLICATION

This application is based upon and claims the benefit of priority from the prior Japanese Patent Application No. 2009-22701, filed on Feb. 3, 2009, the entire contents of which are incorporated herein by reference.

FIELD OF THE INVENTION

The invention relates to a measurement apparatus configured to measure, as a physical amount, a state such as a temperature or a flow velocity of a measurement object such as a liquid, gas or powder, by using electrodes provided to a container for the measurement object. More specifically, the invention relates to a measurement apparatus which includes an electrode unit of an airtight structure.

DESCRIPTION OF THE BACKGROUND

An electromagnetic flowmeter configured to measure a flow rate of a liquid and a thermometer configured to measure a temperature of a liquid, for example, are known as measurement apparatuses configured to measure a state of a measurement object as a physical amount.

An electromagnetic flowmeter creates a magnetic field inside a measurement pipe by feeding an electric current to a coil. Then, the flow rate of a liquid flowing inside the measurement pipe is measured. Specifically, the flow rate is measured by detecting, by using two electrodes, an electromotive force generated in an orthogonal direction to the magnetic field and being proportional to the flow velocity of the liquid, the electrodes being provided in an inner wall surface of the measurement pipe.

To prevent corrosion of the measurement pipe, the inner surface of the measurement pipe is usually provided with a rubber lining or resin lining using a fluororesin, polyurethane resin, or the like.

There are different structures of the electrodes used in the above-described electromagnetic flowmeter depending on a direction of fitting each electrode into a measurement pipe, namely, an external insertion type configured to fit the electrode by pressing the electrode from the outside of the measurement pipe to the inside of the measurement pipe, and an internal insertion type configured to fit an electrode by pulling the electrode from the inside of the measurement pipe to the outside of the measurement pipe. Normally, the internal insertion type is used because the internal insertion type can readily ensure airtightness even when the pressure inside the measurement pipe is increased.

An electrode structure according to Japanese Examined Utility Model Registration Application Publication No. Hei 3-55865 includes a head portion smaller than a measurement-electrode insertion hole, and a measurement pipe is sealed to prevent leakage of a liquid by clamping a lining material with the head portion and a backup material from the inside of the measurement pipe. The electrode structure of the internal insertion type can suppress variation in distance between the electrodes even when the pressure of a fluid is changed.

Meanwhile, an electrode structure according to Japanese Patent Application Publication No. 2007-240231 is a structure configured to reduce insulation deterioration of an electrode even in the case of using a permeable fluid which permeates a lining body. Accordingly, the electrode structure can exhibit a self-sealing function attributable to a wedge effect and a sealing effect by pressurization to a conic portion of an electrode boss forming an outer periphery of a measurement pipe.

In the electrode structure according to Japanese Patent Application Publication No. 2007-240231, an insulating washer which an electrode penetrates is formed in a size equivalent to the inner diameter of an electrode boss and includes an O ring on an outer peripheral end portion of the washer so as to be tightly sealed with an inner peripheral surface of the electrode boss. The structure allows sealing of the permeable fluid which has permeated the lining body, with the O ring so as to prevent the permeable fluid from reaching a spring or a nut. Thereby, insulation deterioration of the electrode and corrosion of the spring can be reduced.

Meanwhile, a thermometer according to Japanese Patent Application Publication No. 2002-48654 has a structure of inserting a temperature sensor provided with a protective pipe, into a measurement pipe from the outside of the measurement pipe while sealing the protective pipe with the temperature sensor provided therein.

The electrode structure of an electromagnetic flowmeter shown in Japanese Patent Application Publication No. 2007-240231 includes a protruding portion on an outer periphery of an electrode head portion. Accordingly, when the electrode is pulled toward the outside of the measurement pipe, the electrode and the lining body receive a sealing pressure concentrated on the protruding portion. Hence it is also possible to secure sealing even when the lining body is formed of a hard resin such as a fluororesin or hard rubber.

Meanwhile, when the lining body is formed of a material such as a fluororesin which allows permeation of a gas or a vapor, an improvement in airtightness is expected because the electrode structure is configured to seal the electrode boss and the insulating washer with the O ring to prevent leakage of the gas or the vapor which has permeated through the lining body.

However, the surface pressure of the protruding portion on the outer periphery of the electrode is not uniform. When viewed in a cross-sectional direction orthogonal to the axis of the measurement pipe, a gap is formed between an inner peripheral surface of the cylindrical measurement pipe and a flat surface portion under a neck of the electrode head portion excluding the protruding portion, the flat surface portion contacting a lining surface. Hence, the airtightness may be easily impaired. Moreover, the structure is configured to seal the electrode boss and the insulating washer with the O ring and is therefore complicated.

Here, the problems of the sealing structure technique of the electromagnetic flowmeter disclosed in Japanese Patent Application Publication No. 2007-240231 will be described with reference to FIGS. 7A to 8B. The sealing structure cannot achieve uniform surface pressure of the protruding portion on the outer periphery of the electrode.

FIG. 7A shows an x-y cross-sectional view of a measurement pipe 31, the cross-section being parallel to a pipe axis direction x as illustrated in FIG. 7B. Meanwhile, FIG. 8A shows a y-z cross-sectional view of the measurement pipe 31, the cross-section being orthogonal to the pipe axis direction x.

A protruding portion 33c having a semicircular cross-section is provided on an outer peripheral portion of an electrode head portion 30a of an electrode 33, the outer peripheral portion being on an opposite side to a surface contacting a measurement object. In the structure, airtightness is not ensured on a large surface of the electrode but is mainly ensured on a small area of the semicircular surface of the protruding portion. Moreover, the airtightness is ensured by pulling up the electrode with a spring 35 so as to obtain a surface pressure necessary for ensuring the airtightness even when a lining body 32 provided on an inner surface of the measurement pipe 31 is made of a relatively hard resin such as a fluororesin.

Specifically, in the technique, a flat surface is located on the side closer to an electrode shaft portion 33b rather than the protruding portion 33c as shown in FIG. 7A. Therefore, in the cross-section parallel to the pipe axis x of the measurement pipe 31 shown in FIG. 7B, the flat surface closely contacts the lining body 32.

However, in the y-z cross section orthogonal to the pipe axis x as shown in FIG. 8A, the surface of the lining body 32 is rounded. Therefore, the periphery of the protruding portion 33c does not have a uniform surface pressure, and a gap Δg is formed between the flat surface and an inner surface of the cylindrical lining body 32 due to the nonuniform surface pressure. Consequently, the airtightness is likely to be impaired.

The same problem exists in any measurement apparatus including an electrode structure configured to seal a lining body 32 and an electrode 33 by pressing an electrode neck portion against the inner peripheral surface of a cylindrical measurement pipe 31, the electrode neck portion having a flat surface orthogonal to a central axis of an electrode insertion hole.

SUMMARY OF THE INVENTION

The invention has been made to solve the foregoing problems. An object of the invention is to provide a measurement apparatus including an electrode provided in an electrode insertion hole which penetrates a measurement pipe to feed a measurement object and a lining body lined on an inner surface of the measurement pipe, the measurement apparatus being capable of easily ensuring air-sealing between the electrode to be inserted from inside of the measurement pipe and the lining body at a uniform surface pressure.

An aspect of the invention provides a measurement apparatus, which includes a measurement apparatus to measure a physical amount of a measurement object. The measurement apparatus includes: a measurement pipe to feed the measurement object; a cylindrical lining body lined on an inner wall surface of the measurement pipe; an electrode insertion hole formed by penetrating a pipe wall of the measurement pipe and the lining body; an electrode inserted in the pipe wall from inside of the measurement pipe with the electrode insertion hole serving as a central axis of the electrode, so as to allow one end portion of the electrode to contact the measurement object; and an electrode fixing unit to be engaged with an opposite end portion of the electrode to fix the electrode by pulling the electrode toward an outer wall of the measurement pipe. The electrode includes: an electrode head portion serving as the one end portion having a first surface exposed to the inside of the measurement pipe so as to contact the measurement object and a second surface located on an opposite side to the first surface; an electrode anchor portion formed around a peripheral portion of the second surface of the electrode head portion so as to be in contact with the lining body with pressure; and an electrode shaft portion serving as the opposite end portion formed integrally with the electrode head portion toward the opposite side to the first surface. The lining body is lined on a surface of the electrode insertion hole and further on a pipe-wall outer edge of the electrode insertion hole, and includes a counterbore flat surface portion so as to define, as a flat surface, a surface closely contacting the second surface of the electrode head portion and being orthogonal to a central axis of the electrode insertion hole. When the electrode shaft portion is pulled in a direction of the central axis of the electrode insertion hole, the electrode anchor portion uniformly comes into contact with the counterbore flat surface portion of the lining body with pressure so as to ensure airtightness between the electrode and the lining body.

Another aspect of the invention provides a measurement apparatus, which includes a measurement apparatus to measure a physical amount of a measurement object. The measurement apparatus includes: a measurement pipe to feed the measurement object; a cylindrical lining body lined on an inner wall surface of the measurement pipe; an electrode insertion hole formed by penetrating a pipe wall of the measurement pipe and the lining body; an electrode inserted in the pipe wall from inside of the measurement pipe with the electrode insertion hole serving as a central axis of the electrode so as to allow one end portion of the electrode to contact the measurement object; and an electrode fixing unit configured to be engaged with an opposite end portion of the electrode to fix the electrode by pulling the electrode in a direction toward an outer wall of the measurement pipe. The electrode includes: an electrode head portion serving as the one end portion having a first surface exposed to the inside of the measurement pipe so as to contact the measurement object and a second surface located on an opposite side to the first surface, the second surface being a flat surface orthogonal to an electrode axis; an electrode anchor portion formed around a peripheral portion of the second surface of the electrode head portion so as to be in contact with the lining body with pressure; and an electrode shaft portion serving as the opposite end portion formed integrally with the electrode head portion toward the opposite side to the first surface. The lining body is lined on a surface of the electrode insertion hole and further on a pipe-wall outer edge of the electrode insertion hole, and is formed to define, as a flat surface, a surface closely contacting the second surface of the electrode head portion and being orthogonal to a central axis of the electrode insertion hole. When the electrode shaft portion is pulled in a direction of the central axis of the electrode insertion hole, the second surface of the electrode head portion uniformly comes into contact with the flat surface of the lining body so as to ensure airtightness between the electrode and the lining body.

Therefore, according to the aspects of the invention, it is possible to provide a measurement apparatus including an electrode provided in an electrode insertion hole which penetrates a measurement pipe to feed a measurement object and a lining body lined on an inner surface of the measurement pipe, the measurement apparatus being capable of easily ensuring air-sealing between the electrode to be inserted from inside of the measurement pipe and the lining body at a uniform surface pressure.

Therefore, according to the aspects of the invention, it is possible to provide a measurement apparatus having a measurement pipe to feed a measurement object and an electrode provided in an electrode insertion hole which penetrates a lining body lined on an inner surface of the measurement pipe, which is capable of sealing airtightness between the electrode to be inserted from inside of the measurement pipe and the lining body easily at a uniform surface pressure.

DETAILED DESCRIPTION OF THE INVENTION

Embodiments of the invention will be described with reference to the drawings. In the following, an electromagnetic flowmeter will be described as an example of a measurement apparatus including an electrode fitting structure of the invention.

First Embodiment

Figure 1:
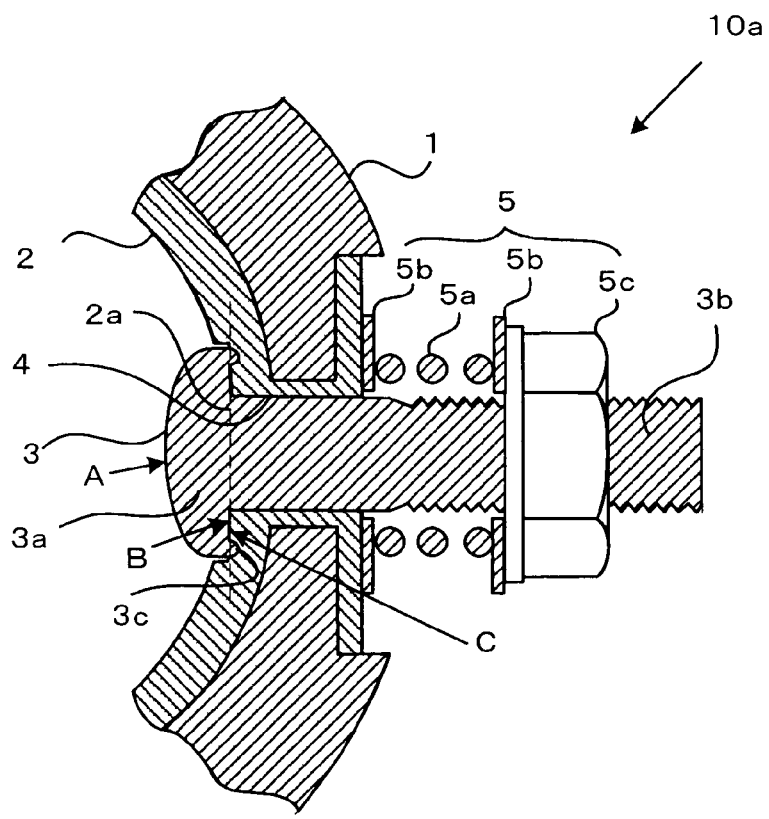
FIG. 1 is a cross-sectional view of an electrode and a peripheral portion of the electrode of an electromagnetic flowmeter which is a measurement apparatus according to a first embodiment of the invention.
Figure 3:
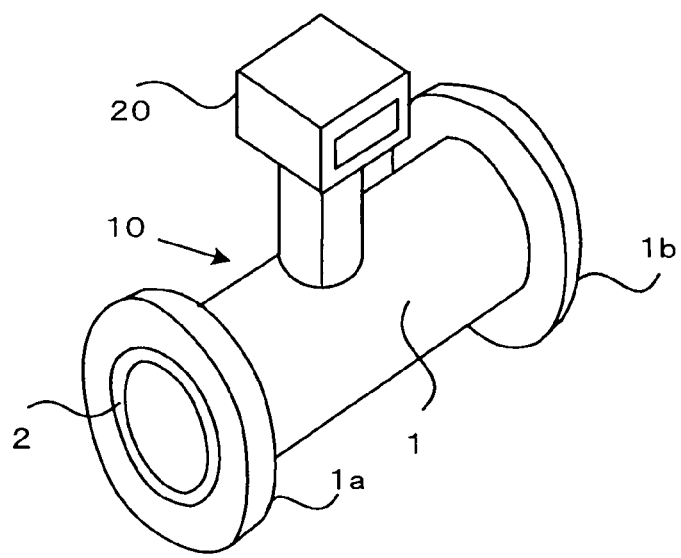
FIG. 3 is an external perspective view of the electromagnetic flowmeter which is the measurement apparatus of the invention.

A first embodiment of the electromagnetic flowmeter of the invention will be described with reference to FIGS. 1 to 3. To begin with, a measurement principle and a general configuration of the electromagnetic flowmeter will be described with reference to FIGS. 2 and 3.

Figure 2:
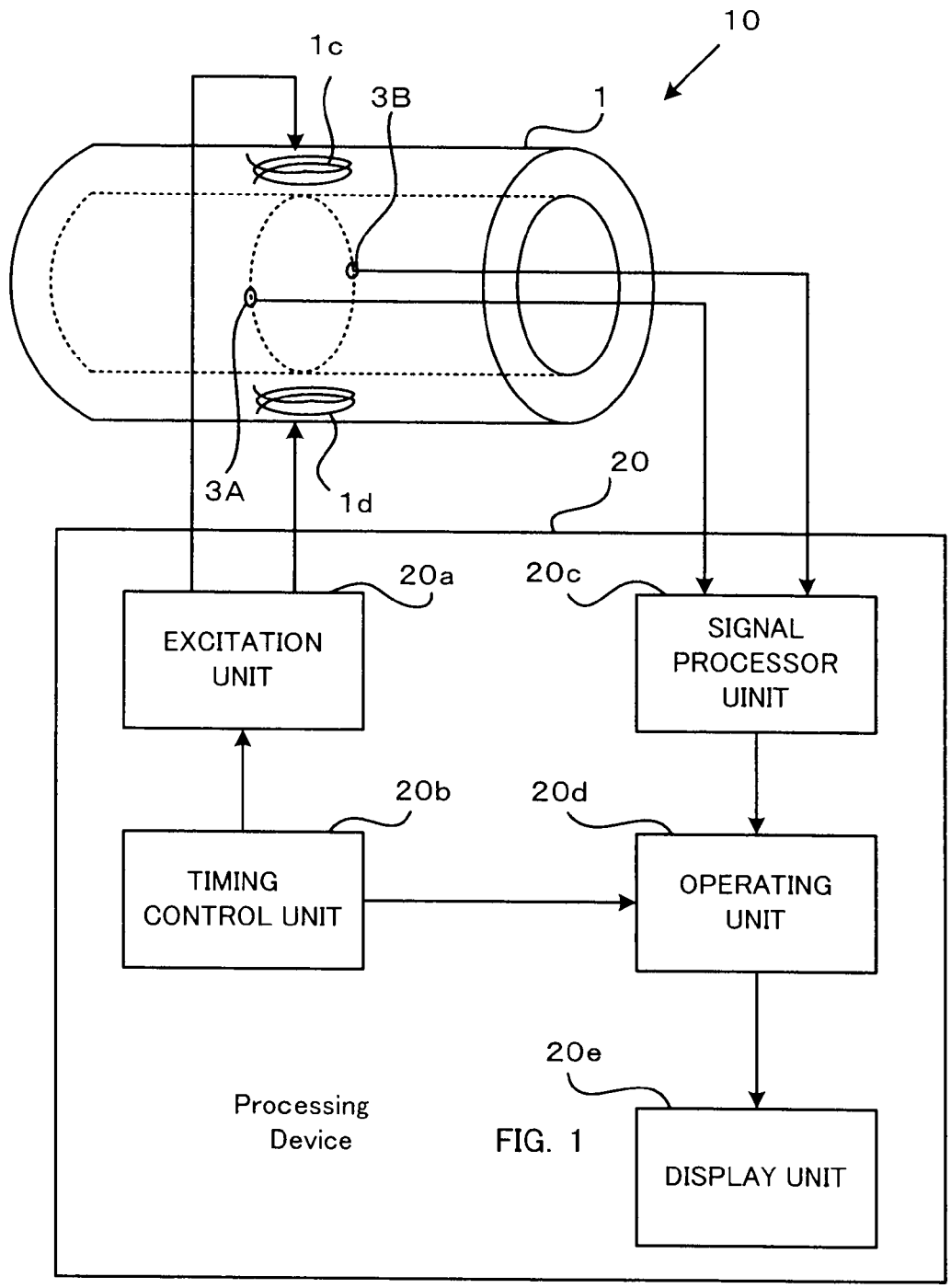
FIG. 2 is a view for explaining a configuration and a principle of the electromagnetic flowmeter which is the measurement apparatus of the invention.

As shown in FIG. 2, the electromagnetic flowmeter includes a detector 10 and a controller 20. In the detector 10, a measurement pipe 1 to feed a fluid as a measurement object is provided with a pair of exciting coils 1c, 1d opposed to each other. Meanwhile, the controller 20 is integrated with the detector 10 and is usually disposed above the measurement pipe 1 of the detector 10.

Next, a schematic configuration and operations of the controller 20 will be described. An excitation current is supplied from an excitation unit 20a to the pair of exciting coils 1c, 1d. The excitation unit 20a supplies the excitation current, which corresponds to a square-wave timing signal sent from a timing control unit 20b, to the pair of exciting coils 1c, 1d.

The timing control unit 20b is formed of a microcomputer, for example, and is configured to generate the square-wave timing signal to define measurement timing and sends the timing signal to the excitation unit 20a and an operating unit 20d.

Signals detected by a pair of electrodes 3A, 3B are sent to a signal processing unit 20c. The signal processing unit 20c performs processing, such as amplification and noise filtering, on the signals sent from the pair of electrodes 3A, 3B, then detects a potential difference between the electrodes, converts the potential difference into a digital signal, and sends the signal to the operating unit 20d.

The operating unit 20d calculates a flow rate based on the signal sent from the signal processing unit 20c in response to the timing signal sent from the timing control unit 20b, and sends the flow rate to a display unit 20e.

The display unit 20e is formed of an LCD (liquid crystal display), for example, and displays the flow rate signal sent from the operating unit 20d.

Next, operations of the electromagnetic flowmeter having the above-described configuration will be described. First, the timing control unit 20b generates a timing signal at predetermined measurement timing and sends the timing signal to the excitation unit 20a and the operating unit 20d. The excitation unit 20a supplies an excitation current to a pair of the exciting coils 1c, 1d in response to the timing signal sent from the timing control unit 20b.

Thereby, a magnetic field is formed between the exciting coil 1c and the exciting coil 1d inside the measurement pipe 1. When the measurement object flows in an orthogonal direction to the magnetic field, an electromotive force is generated in an orthogonal direction to the magnetic field and to the measurement object. The electromotive force generated by a flow velocity of the measurement object is sent as detection signals through the pair of electrodes 3A, 3B to the signal processing unit 20c.

The signal processing unit 20c detects the magnitude of the electromotive force by obtaining the potential difference between the detection signals sent from the pair of electrodes 3A, 3B, converts the detected signal into a digital signal, and sends the digital signal to the operating unit 20d. The operating unit 20d calculates the flow rate by use of the signal indicating the magnitude of the electromotive force, which is sent from the signal processing unit 20c, in response to the timing signal sent from the timing controller 20b, and sends the flow rate to the display unit 20e. The display unit 20e displays the flow rate in response to the signal representing the flow rate which is sent from the operating unit 20d.

Next, a structure of the detector 10 will be described with reference to FIG. 3. As shown in FIG. 3, flanges 1a, 1b to be connected to unillustrated pipes are provided on both ends of the measurement pipe 1. Moreover, the unillustrated electrodes 3A, 3B are disposed opposite to each other in central pipe wall positions of the measurement pipe 1 on an electrode axis which is orthogonal to a pipe axis of the measurement pipe 1 and to a magnetic field axis that is orthogonal to the pipe axis of the measurement pipe 1.

Next, a structure of an electrode unit 10a including one of the electrodes 3 (3A or 3B) of the detector 10 thus configured and a peripheral portion of the electrode 3 will be described with reference to FIG. 1.

The electrode unit 10a includes a cylindrical lining body 2, an electrode insertion hole 4, the electrode 3, and an electrode fixing unit 5. The cylindrical lining body 2 is lined on an inner wall surface of the measurement pipe 1 and also lined on the electrode insertion hole 4 and a pipe-wall outer edge of the electrode insertion hole 4. The electrode insertion hole 4 is provided so as to penetrate a pipe wall of the measurement pipe 1 and the lining body 2. The electrode 3 is inserted in the measurement pipe 1 from the inside of the measurement pipe 1 with the electrode insertion hole 4 serving as a central axis of the electrode 3 so as to allow one end portion of the electrode to contact the measurement target. The electrode fixing unit 5 is configured to be engaged with an opposite end portion of the electrode 3 to fix the electrode 3 by pulling the electrode 3 toward an outer wall of the measurement pipe 1.

Next, each constituent of the electrode unit 10a will be described. The measurement pipe 1 is formed of a metal pipe such as SUS. Then, a hole to form the electrode insertion hole 4 is formed in advance at a position in the pipe wall to form the electrode insertion hole 4.

Meanwhile, the electrode 3 includes an electrode head portion 3a, an electrode anchor portion 3c, and an electrode shaft portion 3b. The electrode head portion 3a is the one end portion having a first surface A and a second surface B. The first surface A is exposed to the inside of the measurement pipe 1 so as to contact the measurement object. The second surface B is located on the opposite side to the first surface A. The electrode anchor portion 3c is formed around a peripheral portion of the second surface B of the electrode head portion 3a so as to be in contact with the lining body 2 with pressure. The electrode shaft portion 3b is the opposite end portion formed integrally with the electrode head portion 3a toward the opposite side to the first surface A.

To be more precise, the electrode anchor portion 3c is prepared as follows. The second surface B is formed into a flat surface orthogonal to the electrode axis. A protrusion is formed around the peripheral edge portion of the second surface B, the protrusion having a size smaller than a radius of the electrode shaft portion 3b and a semicircular cross-section viewed from an orthogonal direction to the central axis of the electrode shaft portion 3b. An under-neck surface C of the second surface B excluding the electrode anchor portion 3c is formed into a flat surface.

Moreover, the lining body 2 is made of a resin material such as a fluororesin or hard rubber and is lined on the inside of the measurement pipe 1, the surface of the electrode insertion hole 4, and further to the pipe-wall outer edge of the electrode insertion hole 4. Then, a counterbore flat surface portion 2a is formed by counterboring so that the lining surface opposed to the under-neck surface C of the electrode 3 can closely contact the under-neck surface C when the electrode 3 is inserted in the electrode insertion hole 4.

The counterbore flat surface portion 2a is formed into a flat surface orthogonal to the central axis of the electrode insertion hole 4 and into a size equal to or greater than the electrode head portion 3a.

Meanwhile, the electrode fixing unit 5 includes a pair of spacers 5b, a spring 5a, and a nut 5c. The pair of spacers 5b are provided on the electrode shaft portion 3b and configured to surface-contact an outer surface of the pipe-wall outer edge of the lining body 2 and thereby to hold the lining body 2. The spring 5a is inserted between the pair of spacers 5b. The nut 5c is screwed on the electrode shaft portion 3b from behind the spring 5a. The electrode fixing unit 5 is configured to constantly pull the electrode 3 toward the outside of the measurement pipe 1 along the central axis of the electrode.

Next, operations and effects of the electrode unit 10a thus configured will be described. The electrode anchor portion 3c of the electrode 3 is formed to have a semicircular portion of a small diameter. Accordingly, the electrode anchor portion 3c having the semicircular shaped protrusion and the counterbore flat surface portion 2a form an almost linear sealing surface even if the electrode anchor portion 3c has a small pressing force against the flat surface of the counterbore flat surface portion 2a of the lining body 2. Therefore, the electrode anchor portion 3c having the semicircular protrusion easily breaks into the counterbore flat surface portion 2a and exerts an effect to concentrate the pulling force from the electrode fixing unit 5 onto the sealing surface.

Moreover, when the pressure inside the measurement pipe 1 is increased to press the first surface A of the electrode head portion 3a, the under-neck surface C excluding the electrode anchor portion 3c closely contacts the flat surface of the counterbore flat surface portion 2a of the lining body 2 corresponding to the under-neck surface C and exerts an effect to increase a surface pressure of the counterbore flat surface portion 2a and to enhance airtightness.

Meanwhile, the spring 5a of the fixing unit 5 constantly pulls the electrode 3 inserted from the inside of the measurement pipe 1 toward the outside of the measurement pipe 1. As a consequence, the thickness of the lining body 2 may be changed with time or the pressure inside the measurement pipe 1 may be changed. Thereby, even if the electrode 3 is displaced by a change in the force to press the electrode head portion 3a, there is an effect to cause the electrode to follow such a displacement and thereby to ensure airtightness.

Moreover, the structure of the electrode unit 10a of the invention has an effect to improve retention of airtightness easily by only forming the counterbore flat surface portion 2a on the surface of the lining body 2, where the lining body 2 contacts the electrode 3, without adding any new constituent.

Second Embodiment

Figure 4:
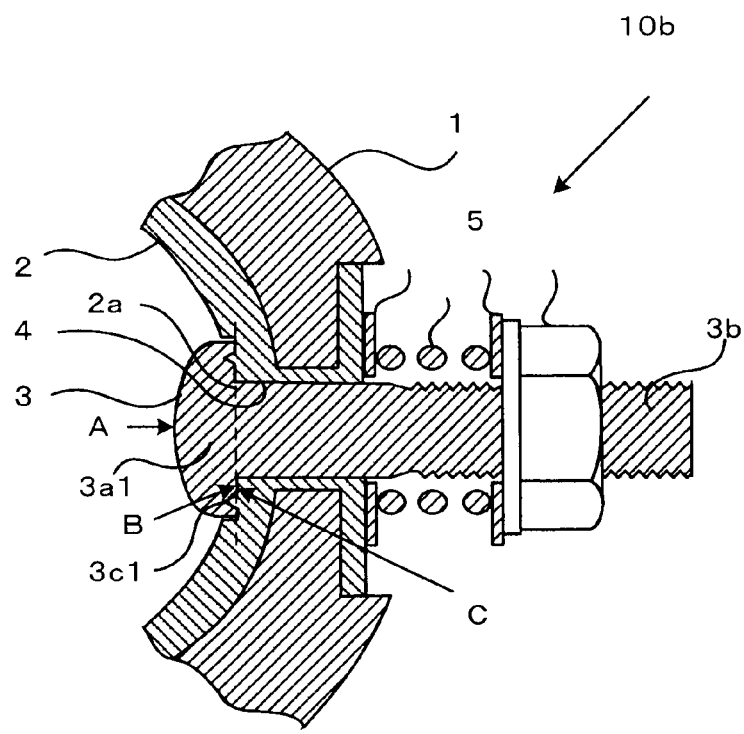
FIG. 4 is a cross-sectional view of an electrode and a peripheral portion of the electrode of an electromagnetic flowmeter which is a measurement apparatus according to a second embodiment of the invention.

Next, a second embodiment of the invention will be described with reference to FIG. 4. Concerning portions shown in FIG. 4, the same portions as those in the first embodiment shown in FIG. 1 will be designated by the same reference numerals and explanations of the relevant portions will be omitted.

The second embodiment is different from the first embodiment in the following point. Specifically, the electrode 3 of the first embodiment is configured to ensure airtightness by forming the electrode anchor portion 3c in the shape of the protrusion around the outer peripheral edge portion of the second surface B of the electrode 3, the protrusion having a size smaller than the radius of the electrode shaft portion 3b and the semicircular cross-section, then pulling the electrode 3 toward the outside of the measurement pipe 1 along the central axis of the electrode while tightening the nut 5c of the electrode fixing unit 5, and causing the electrode anchor portion 3c to break into the flat surface of the counterbore flat surface portion 2a of the lining body 2. On the other hand, the second embodiment is configured to ensure airtightness by forming a V groove 3c1 around the peripheral portion of the second surface B, the V groove 3c1 having a size smaller than the radius of the electrode shaft portion 3b and a V-shaped cross-section, pulling the electrode 3 toward the outside of the measurement pipe 1 along the central axis of the electrode while tightening the nut 5c of the electrode fixing unit 5, and causing the counterbore flat surface portion 2a of the lining body 2 to break into the V groove 3c1.

According to the second embodiment, the under-neck surface C of the second surface B closely contacting the counterbore flat surface portion 2a is formed into the flat surface, and the surface pressure attributable to the pulling force of the electrode fixing unit 5 is not concentrated on the linear sealing surface as defined by the electrode anchor portion 3c in the first embodiment. As a consequence, the surface pressure to ensure airtightness becomes weaker than that in the first embodiment. However, if the lining body 2 is rendered sufficiently softer than the electrode 3 that is made of metal, then the lining body 2 breaks into the V groove when the electrode 3 is pulled to the outside of the measurement pipe 1 along the central axis of the electrode. Hence it is possible to ensure the same degree of airtightness as that in the first embodiment.

Third Embodiment

Figure 5:
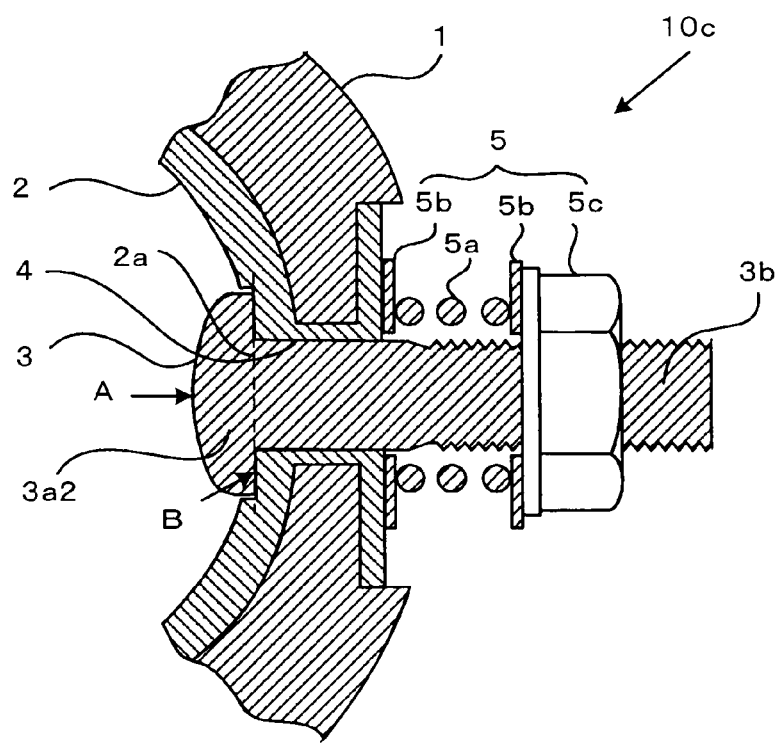
FIG. 5 is a cross-sectional view of an electrode and a peripheral portion of the electrode of an electromagnetic flowmeter which is a measurement apparatus according to a third embodiment of the invention.

Next, a third embodiment of the invention will be described with reference to FIG. 5. Concerning portions shown in FIG. 5, the same portions as those in the first embodiment shown in FIG. 1 will be designated by the same reference numerals and explanations of the relevant portions will be omitted.

The third embodiment is different from the first embodiment in the following point. Specifically, the electrode 3 of the first embodiment is configured to ensure airtightness by forming the electrode anchor portion 3c in the shape of the protrusion around the outer peripheral edge portion of the second surface B of the electrode 3, the protrusion having a size smaller than the radius of the electrode shaft portion 3b and the semicircular cross-section, and then causing the electrode anchor portion 3c to break into the flat surface of the counterbore flat surface portion 2a of the lining body 2 when the electrode 3 is pulled toward the outside of the measurement pipe 1 along the central axis of the electrode with the nut 5c of the electrode fixing unit 5 being tightened. On the other hand, the third embodiment is configured to ensure airtightness by leaving the second surface B under the neck of the electrode 3 flat as originally processed, and forming a sealing surface by closely contacting two flat surfaces, namely, the counterbore flat surface portion 2a of the lining body 2 and the flat surface portion on the second surface B, each other when the electrode 3 is pulled toward the outside of the measurement pipe 1 along the central axis of the electrode with the nut 5c being tightened.

The third embodiment does not include the linear sealing surface unlike the first embodiment. Accordingly, when the electrode 3 is pulled toward the outside of the measurement pipe 1 along the central axis of the electrode, the sealing surface is formed by use of the two flat surfaces by closely contacting the completely flat second surface B of the electrode 3 to the counterbore flat surface portion 2a. As a consequence, the surface pressure to ensure airtightness becomes weaker than that in the first embodiment. However, if the lining body 2 is rendered sufficiently softer than the electrode 3 that is made of metal, it is possible to ensure the same degree of airtightness as those in the first embodiment and the second embodiment.

Fourth Embodiment

Figure 6:
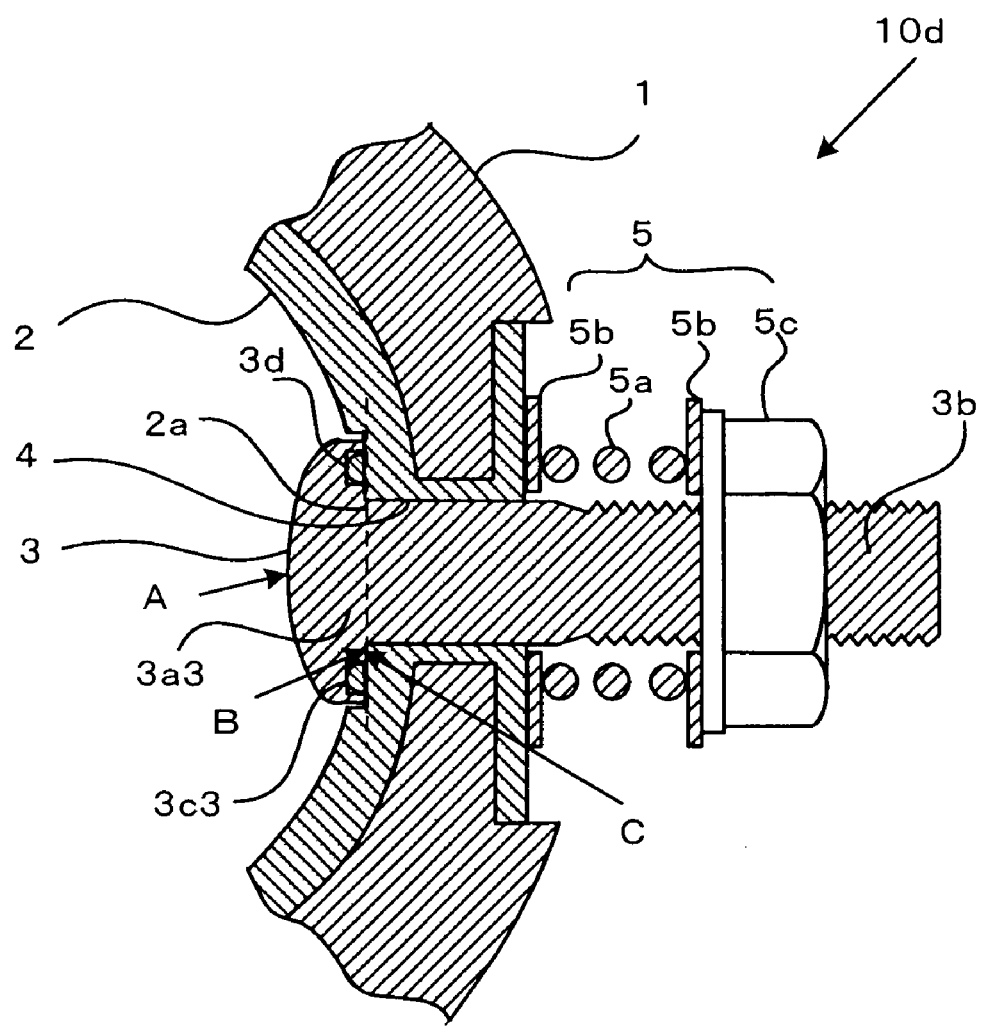
FIG. 6 is a cross-sectional view of an electrode and a peripheral portion of the electrode of an electromagnetic flowmeter which is a measurement apparatus according to a fourth embodiment of the invention.
Figure 7A:
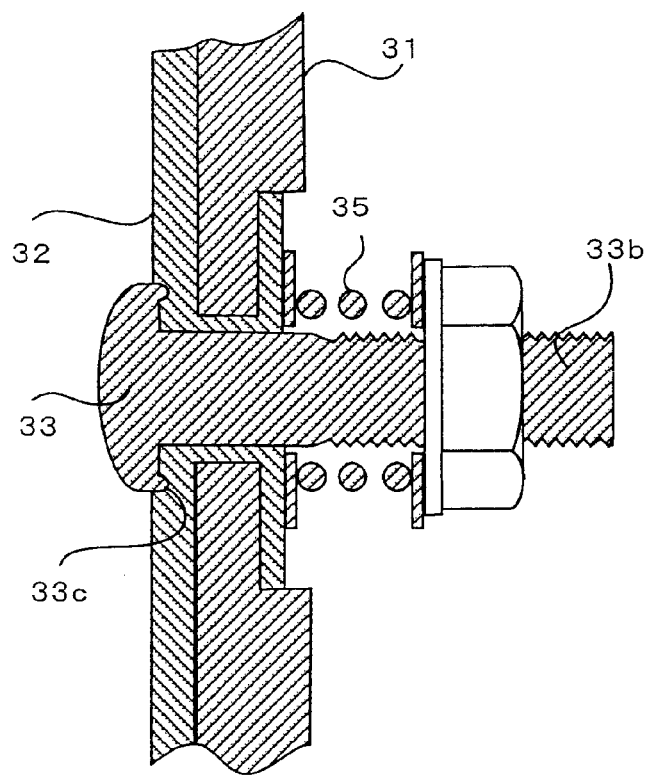
FIG. 7A is a cross-sectional view and FIG. 7B is a perspective view of an electrode and a peripheral portion of the electrode of a conventional electromagnetic flowmeter.
Figure 7B:
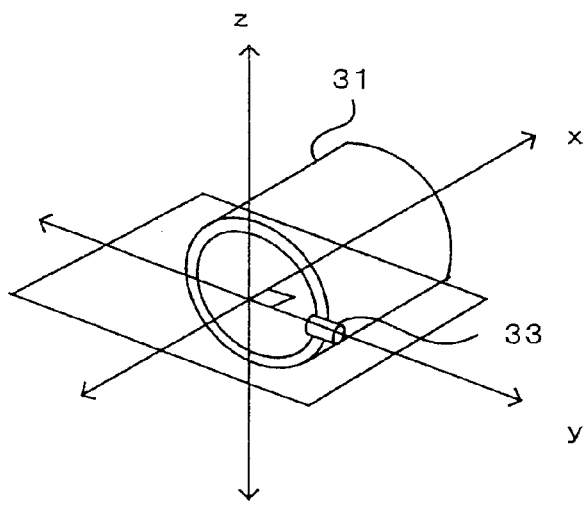
Figure 8A:
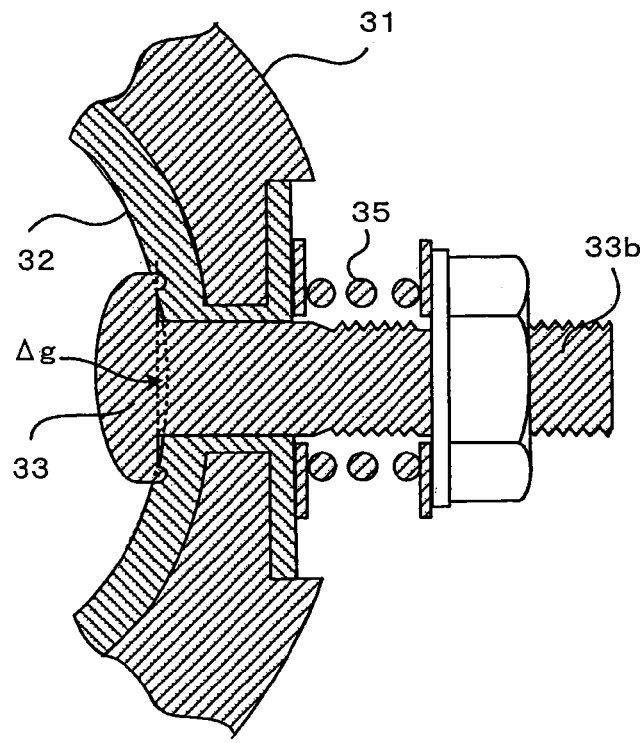
FIG. 8A is another cross-sectional view and FIG. 8B is another perspective view of the electrode and the peripheral portion of the electrode of the conventional electromagnetic flowmeter.
Figure 8B:
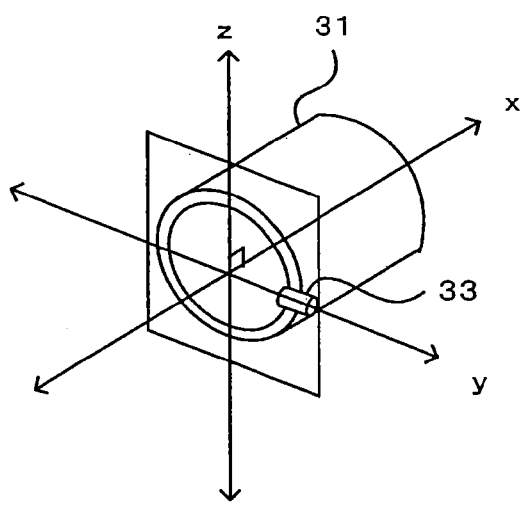

Next, a fourth embodiment of the invention will be described with reference to FIG. 6. Concerning portions shown in FIG. 6, the same portions as those in the first embodiment shown in FIG. 1 will be designated by the same reference numerals and explanations of the relevant portions will be omitted.

The fourth embodiment is different from the first embodiment in the following point. Specifically, the electrode 3 of the first embodiment is configured to ensure airtightness by forming the electrode anchor portion 3c in the shape of the protrusion around the outer peripheral edge portion of the second surface B of the electrode 3, the protrusion having a size smaller than the radius of the electrode shaft portion 3b and the semicircular cross-section, and then causing the electrode anchor portion 3c to break into the flat surface of the counterbore flat surface portion 2a of the lining body 2 when the electrode 3 is pulled toward the outside of the measurement pipe 1 along the central axis of the electrode with the nut 5c of the electrode fixing unit 5 being tightened. On the other hand, in the fourth embodiment, an O ring groove 3c3 is formed in the second surface B under the neck of the electrode 3, so that airtightness can be ensured by the counterbore flat surface portion 2a of the lining body 2 and an O ring 3d provided in the O ring groove 3c3 when the electrode 3 is pulled toward the outside of the measurement pipe 1 along the central axis of the electrode with the nut 5c being tightened.

In the fourth embodiment, a linear sealing surface is formed by use of the O ring 3d instead of the electrode anchor portion 3c of the first embodiment. Accordingly, it is possible to set up the airtightness using the O ring 3d so as to achieve an equivalent effect to that of the first embodiment. However, if the measurement object is highly corrosive, it is then necessary to select the material of the O ring 3d or to restrict the use of the O ring 3d.

Nevertheless, according to the fourth embodiment, a material far softer than the lining body 2 is selected for the O ring 3d. As a consequence, there is an effect that the lining body 2 can be used repeatedly without damaging the sealing portion of the lining body 2.

The invention is not limited only to the above-described embodiments. The invention only requires the configuration to form a counterbore surface portion in a cylindrical curved surface of a lining body on a measurement pipe and to form a sealing surface by appropriately selecting the surface shape of an electrode which closely contacts the counterbore surface portion of the lining body depending on the measurement object. Therefore, various optimum modifications are possible to the shape of the electrode surface and the structure of the electrode fixing unit appropriately without departing from the scope of the invention.

Other embodiments or modifications of the present invention will be apparent to those skilled in the art from consideration of the specification and practice of the invention disclosed herein. It is intended that the specification and example embodiments be considered as exemplary only, with a true scope and spirit of the invention being indicated by the following.

What is claimed is:

1. A measurement apparatus to measure a physical amount of a measurement object, the measurement apparatus comprising:

a measurement pipe to feed the measurement object;

a cylindrical lining body lined on an inner wall surface of the measurement pipe;

an electrode insertion hole formed by penetrating a pipe wall of the measurement pipe and the lining body;

an electrode inserted in the pipe wall from inside of the measurement pipe with the electrode insertion hole serving as a central axis of the electrode, so as to allow one end portion of the electrode to contact the measurement object; and an electrode fixing unit to be engaged with an opposite end portion of the electrode to fix the electrode by pulling the electrode toward an outer wall of the measurement pipe;

wherein:

the electrode includes an electrode head portion serving as the one end portion having a first surface exposed to the inside of the measurement pipe so as to contact the measurement object, and a second surface located on an opposite side to the first surface, an electrode anchor portion formed around a peripheral portion of the second surface of the electrode head portion, and an electrode shaft portion serving as the opposite end portion formed integrally with the electrode head portion toward the opposite side to the first surface;

the second surface excluding the electrode anchor portion forms a flat surface orthogonal to the electrode shaft portion and a protruding portion is formed around a peripheral edge portion of the second surface, the protruding portion having a semicircular cross-section and a size smaller than a radius of the electrode shaft portion;

the lining body is lined on a surface of the electrode insertion hole and further on a pipe-wall outer edge of the electrode insertion hole, and includes a counterbore flat surface portion at an arc portion around a central axis of the electrode insertion hole of an inner surface of the lining body so as to define a flat surface having an area equal to or larger than an area of the second surface;

the electrode fixing unit includes a first spacer and a second spacer provided on the electrode shaft portion so as to hold the pipe-wall outer edge of the lining body, a spring inserted between the first spacer and the second spacer, and a nut screwed on the electrode shaft portion from behind the spring; and while uniformly coming into contact with the counterbore flat surface portion of the lining body with pressure, the protruding portion of the electrode anchor portion bites into the counterbore flat surface portion, when the nut is screwed, to uniformly raise a surface pressure between the second surface of the electrode and the counterbore flat surface portion, so as to ensure airtightness between the electrode and the lining body.

2. The measurement apparatus according to claim 1, wherein in the electrode anchor portion the second surface is a flat surface orthogonal to the electrode shaft portion and forms a V groove around the peripheral portion of the second surface, the V groove having a V-shaped cross-section and a size smaller than a radius of the electrode shaft portion.

3. The measurement apparatus according to claim 1, wherein in the electrode anchor portion the second surface is a flat surface orthogonal to the electrode shaft portion and forms an O ring groove to fit an O ring around the peripheral portion of the second surface, the O ring is inserted in the O ring groove, and thereby when the electrode shaft portion is pulled in the direction of the central axis of the electrode insertion hole, the electrode anchor portion causes the O ring to uniformly come into contact with the counterbore flat surface portion of the lining body with pressure so as to ensure the airtightness between the electrode and the lining body.

4. A measurement apparatus to measure a physical amount of a measurement object, the measurement apparatus comprising:

a measurement pipe to feed the measurement object;

a cylindrical lining body lined on an inner wall surface of the measurement pipe;

an electrode insertion hole formed by penetrating a pipe wall of the measurement pipe and the lining body;

an electrode inserted in the pipe wall from inside of the measurement pipe with the electrode insertion hole serving as a central axis of the electrode so as to allow one end portion of the electrode to contact the measurement object; and an electrode fixing unit configured to be engaged with an opposite end portion of the electrode to fix the electrode by pulling the electrode in a direction toward an outer wall of the measurement pipe;

wherein:

the electrode includes an electrode head portion serving as the one end portion having a first surface exposed to the inside of the measurement pipe so as to contact the measurement object, and a second surface located on an opposite side to the first surface, the second surface being a flat surface orthogonal to an electrode axis, and an electrode shaft portion serving as the opposite end portion formed integrally with the electrode head portion toward the opposite side to the first surface;

the lining body is lined on a surface of the electrode insertion hole and further on a pipe-wall outer edge of the electrode insertion hole, and includes a counterbore flat surface portion at an arc portion around a central axis of the electrode insertion hole of an inner surface of the lining body so as to define a flat surface having an area equal to or larger than an area of the second surface;

the electrode fixing unit includes a first spacer and a second spacer provided on the electrode shaft portion so as to hold the pipe-wall outer edge of the lining body, a spring inserted between the first spacer and the second spacer, and a nut screwed on the electrode shaft portion from behind the spring; and a flat surface portion of the second surface of the electrode head portion uniformly comes into contact with the counterbore flat surface portion of the lining body, when the nut is screwed, so as to ensure airtightness between the electrode and the lining body.

* * * * *